United States Patent
Blotnik et al.

(10) Patent No.: US 11,787,635 B2
(45) Date of Patent: Oct. 17, 2023

(54) MOVABLE PICKING STATIONS

(71) Applicant: GET FABRIC LTD., Tel Aviv (IL)

(72) Inventors: Guy Blotnik, Tel Aviv (IL); Shmuel Ur, Shorashim (IL)

(73) Assignee: GET FABRIC LTD, Tel Aviv (IL)

( * ) Notice: Subject to any disclaimer, the term of this patent is extended or adjusted under 35 U.S.C. 154(b) by 398 days.

(21) Appl. No.: 17/132,218

(22) Filed: Dec. 23, 2020

(65) Prior Publication Data
US 2021/0188553 A1    Jun. 24, 2021

Related U.S. Application Data

(60) Provisional application No. 62/952,648, filed on Dec. 23, 2019.

(51) Int. Cl.
*B65G 1/137* (2006.01)
(52) U.S. Cl.
CPC .................................. *B65G 1/1375* (2013.01)
(58) Field of Classification Search
CPC ...................................................... B65G 1/1375
See application file for complete search history.

(56) References Cited

U.S. PATENT DOCUMENTS

| | | | | |
|---|---|---|---|---|
| 3,664,523 A | * | 5/1972 | Hagel | B66B 9/00 187/250 |
| 5,333,983 A | * | 8/1994 | Hatouchi | B65G 1/10 700/214 |
| 9,008,827 B1 | * | 4/2015 | Dwarakanath | F25B 27/00 700/214 |
| 9,665,095 B1 | * | 5/2017 | Romano | B25J 5/007 |
| 10,315,231 B1 | * | 6/2019 | Brazeau | B07C 5/38 |
| 10,392,190 B1 | * | 8/2019 | Theobald | B25J 9/161 |
| 10,865,043 B1 | * | 12/2020 | Garcia | B25J 9/0096 |
| 10,954,067 B1 | * | 3/2021 | Theobald | B25J 19/022 |
| 2004/0010337 A1 | * | 1/2004 | Mountz | G05D 1/0297 700/214 |
| 2012/0029687 A1 | * | 2/2012 | Hagen | G07F 11/165 700/218 |
| 2014/0052498 A1 | * | 2/2014 | Marshall | G07F 9/0235 700/218 |
| 2015/0032252 A1 | * | 1/2015 | Galluzzo | B60P 1/5423 700/218 |
| 2015/0242918 A1 | * | 8/2015 | McCarthy | G06Q 30/0635 705/26.43 |
| 2016/0167228 A1 | * | 6/2016 | Wellman | B25J 9/1602 901/3 |
| 2016/0176638 A1 | * | 6/2016 | Toebes | B25J 5/007 701/25 |

(Continued)

*Primary Examiner* — Kyle O Logan
(74) *Attorney, Agent, or Firm* — MYERS WOLIN, LLC

(57) ABSTRACT

An inventory handling system and a method for managing thereof, comprising multiple shelving units with shelves on which containers are placed. The system comprises a movable picking station configured to travel among the shelving units, and transfer items between containers. The movable picking station is configured to collect from the multiple shelving units into an order container at least a portion of a plurality of items listed in an order to be fulfilled. The movable picking station is configured to place the pickable items in the order container in an optimal arrangement while minimizing the distance the containers are moved and potential damage to the items.

19 Claims, 8 Drawing Sheets

(56) References Cited

U.S. PATENT DOCUMENTS

| | | | |
|---|---|---|---|
| 2016/0325933 A1* | 11/2016 | Stiernagle | B65G 1/10 |
| 2018/0215539 A1* | 8/2018 | Kimura | G05D 1/0274 |
| 2019/0188632 A1* | 6/2019 | Galluzzo | B25J 15/0028 |
| 2019/0270591 A1* | 9/2019 | Lert, Jr. | B65G 1/0435 |
| 2020/0167727 A1* | 5/2020 | Ikeda | G06Q 10/087 |
| 2020/0242544 A1* | 7/2020 | Galluzzo | G05D 1/0088 |
| 2020/0310463 A1* | 10/2020 | Beniyama | G05D 1/0212 |
| 2021/0089046 A1* | 3/2021 | Xu | G01B 11/026 |
| 2023/0019883 A1* | 1/2023 | Austrheim | B66F 9/063 |

\* cited by examiner

MOVABLE PICKING STATIONS

CROSS-REFERENCE TO RELATED APPLICATIONS

This application claims the benefit of U.S. provisional Application No. 62/952,648, entitled "DECENTRALIZING & DISTRIBUTED PICKING", filed Dec. 23, 2019, which is hereby incorporated by reference in its entirety, without giving rise to disavowment.

TECHNICAL FIELD

The present invention relates to automation in general, and automated inventory handling, in particular.

BACKGROUND

The distribution center is one of the key links in the on-line retail supply chain, and also one of the key bottlenecks. Distribution centers generally warehouse a large inventory of products, such as grocery items, of differing types, sizes, packaging and other physical characteristics. In response to customer orders, personnel in the DC pick and pack the required inventory items into deliverable packages for shipment to the customers.

A number of systems have been developed for automatically moving inventory items to and from shelves in a warehouse. Some systems are based on the use of autonomous vehicles, transfer units, robots, and the like, having means for automatically loading and unloading a payload. The autonomous vehicles (or robots, or the like) perform both transfer and transport functions in moving containers of items within a workspace via a network of roadways. Under computer control, the autonomous vehicles (or robots, or the like) transfer and transport case containers of item units between incoming receiving stations, intermediate storage locations, and outgoing order-assembly stations where entire containers or individual item units are combined in the outbound container.

In some cases, the inventory handling systems may be linear transfer systems made up of a plurality of transfer units (or robots, or the like) that travel in unison in a linear motion past the input and output of a first processing station. The transfer units either receive articles from the output and discharge articles to the input or transfer articles between the first processing station and a second processing station. A control sequences articles between the transfer units and the first input and output or between the first processing station and a second processing station in a manner that enhances operation of the processing station.

BRIEF SUMMARY

One exemplary embodiment of the disclosed subject matter is an inventory handling system, comprising: multiple shelving units for mounting over a horizontal floor, each shelving unit comprises a vertical array of shelves on which containers are placed, wherein at least a portion of the containers comprise items; and a movable picking station, which is configured to travel among the shelving units, wherein the movable picking station is configured to transfer items between containers, wherein the movable picking station is configured to collect into an order container at least a portion of a plurality of items listed in an order.

Optionally, the inventory handling system further comprises: one or more floor robots, which are configured to travel among the shelving units on the horizontal floor, wherein the one or more floor robots are configured to transfer containers from the shelving units to one or more packing stations; and one or more lift robots, which are configured to move independently of the one or more floor robots along paths in a vertical plane over vertical faces of the shelving units, wherein the vertical plane is orthogonal to the horizontal floor, wherein the one or more lift robots are configured to be utilized in transferring the containers between the shelves and the one or more floor robots.

Optionally, the movable picking station is configured to travel horizontally along a bottom of the shelving units. The one or more lift robots are configured to transfer containers from the shelves to the bottom of the shelving units, whereby the movable picking station is capable of picking items from transferred containers without the transferred containers leaving the shelving units.

Optionally, the one or more lift robots are configured to carry the movable picking station over the vertical faces of the shelving units. The movable picking station is configured to pick items from containers stored in the shelving units while being carried by the one or more lift robots.

Optionally, the multiple shelving units are arranged over the floor side by side, with a predefined gap between the vertical faces of adjacent shelving units. The movable picking station is configured to move along the shelving units within the gap. The movable picking station is configured, while moving within the gap, to engage the shelving units on at least one side of the gap.

Optionally, the multiple shelving units are arranged over the floor side by side, with a predefined gap between the vertical faces of adjacent shelving units, wherein the movable picking stations is configured to move along the shelving units within the gap, wherein the movable picking station is configured to disengage autonomously from the vertical faces of the shelving units onto one or more floor robots, and wherein the one or more floor robots are configured to transport the movable picking station from one gap to another gap among the shelving units, whereupon the movable picking station is configured to autonomously reengage with the vertical faces of the shelving units in the other gap.

Optionally, the movable picking station comprises the order container.

Optionally, the movable picking station comprises a robotic arm configured to be extended through the vertical face of the one of the shelving units and to pick an item from a designated container while the designated container is stored in the shelving units.

Optionally, the movable picking stations comprises: a vision sensor configured to capture an inside view of the designated container; and a gripper configured to extract an item from the designated container and move the item to the order container.

Optionally, the inventory handling system further comprises: a planning unit, wherein the planning unit is configured to determine a sequence of picking tasks for the movable picking station, wherein the sequence of picking tasks is determined based on properties of items of an order.

Optionally, the planning unit is configured to cause placement within the order container that avoids crushing of previously placed items by newly placed items.

Another exemplary embodiment of the disclosed subject matter is a method for inventory handling, comprising: obtaining an order to be fulfilled, wherein the order comprises a list of items to be picked from containers located on shelves in multiple shelving units, wherein the multiple shelving units are mounted over a horizontal floor, wherein each shelving unit comprising a vertical array of the shelves, wherein the items comprise at least one pickable item; determining a location of a designated container that comprises the at least one pickable item; operating a movable picking station to pick the at least one pickable item from the designated container and to place the at least one pickable item in an order container, wherein the placement of the at least one pickable item in the order container is performed while the movable picking station is located at the multiple shelving unit, whereby minimizing the distance the designated container is moved from the location.

Optionally, said operating the movable picking station comprises: causing the movable picking station to travel among the shelving units to reach the location of the designated container; and picking, by the movable picking station, the at least one pickable item from the designated container, without moving the designated container from the location.

Optionally, the method further comprises: operating a floor robot to travel in the horizontal floor among the shelving units along a first path to a rendezvous point; and conveying the order container from the rendezvous point to a packing station, wherein said conveying is performed using the floor robot.

Optionally, the order container is embedded within movable picking station; and said conveying comprises the floor robot transporting the movable picking station the packing station.

Optionally, the method further comprises: operating a lift robot to move, independently of the floor robot, and while being suspended above the ground, along a second path in a vertical plane over a vertical face of the one of the shelving units, wherein the vertical face is a plane orthogonal to the horizontal floor; prior to said operating the movable picking station, transporting the movable picking station, using the lift robot, from a first location to a second location adjacent to the location of the designated container; after said operating the movable picking station, transporting the movable picking station, using the lift robot, from the second location to the rendezvous point.

Optionally, the method further comprises: operating a lift robot to move, independently of the floor robot, and while being suspended above the ground, along a second path in a vertical plane over a vertical face of the one of the shelving units, wherein the vertical face is a plane orthogonal to the horizontal floor; prior to said operating the movable picking station, transporting the designated container, using the lift robot, to a third location adjacent to the movable picking station; and after said operating the movable picking station, transporting the designated container, using the lift robot, from the third location adjacent to the location of the designated container.

Optionally, the movable picking station is located on the floor robot, wherein the third location is at a lowest shelf plane of the shelving unit.

Optionally, the movable picking station is located at a lowest shelf plane of the shelving unit, wherein the third location is at the lowest shelf of the shelving unit.

Optionally, the items comprise a second pickable item, wherein the second pickable item is heavier than the at least one pickable item, wherein the method further comprises: determining a second location of a second container comprising the second pickable item; operating the movable picking station to pick the second pickable item from the second container and place the second pickable item in the order container, wherein the at least one pickable item is placed on top of the second pickable item.

Optionally, the method further comprises: identifying a subset of items from the list of items, wherein the subset of items comprises pickable items, wherein the subset of items comprises the at least one pickable item; determining an order of picking the pickable items in the subset of items; operating the movable picking station to pick the pickable items from containers and place the pickable items in the order container, wherein picking and placing the pickable items comprise picking and placing the at least one pickable items, wherein said operating is performed in accordance with the order of picking.

Optionally, the method further comprises: operating one or more floor robots to transport the order container to a packaging station, wherein the one or more floor robots travel in the horizontal floor; operating to one or more floor robots to transport one or more inventory containers from the shelving units to the packing station, wherein the one or more inventory containers comprise items in a second subset of items from the list of items; and at the packing station, assembling in the order container the order by adding to the order container items from the one or more inventory containers.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
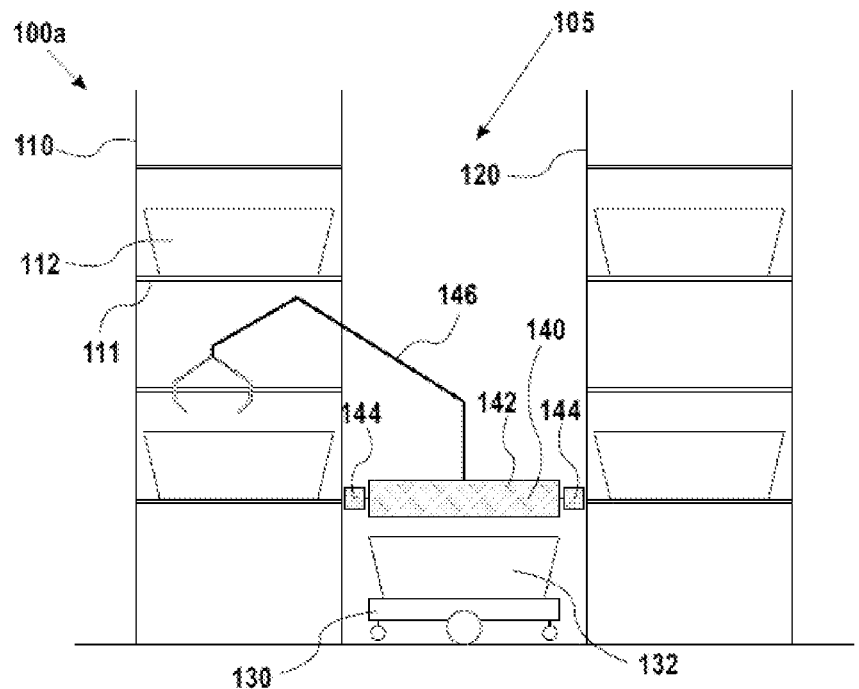
FIGS. 1A-1B show schematic illustrations of an exemplary environment and architecture, in accordance with some exemplary embodiments of the disclosed subject matter.

One technical problem dealt with by the disclosed subject matter is to improve the operation of robotic inventory handling systems. In some exemplary embodiments, robotic inventory handling systems may be may be configured to utilize robots or other automatic transfer units for collecting items or products from inventory containers in accordance with a customer order or inventory arrangement, to a location where the total order being assembled, such as a picking station, an order assembly station, or the like. In some exemplary embodiments, the assembly station may be manned or automatic, and may be configured to handle the order, picking the items from the robots or the transfer units, arranging the items, performing insertions, packing the order, or the like. Great efforts may be required to ensure coordination between the different parts of the system, different types of robots, managing the assembly actions, or the like. Accordingly, the inventory handling may require human intervention, consuming manpower and time and being less efficient.

In some exemplary embodiments, an inventory handling system may comprise multiple shelving units for mounting over a horizontal floor, either mounted on the floor itself or suspended above it, such as disclosed in U.S. Pat. No. 10,472,172B2, entitled "Robotic inventory handling", filed Aug. 6, 2016, which is hereby incorporated by reference in its entirety for all purposes and without giving rise to disavowment. The vending-tote may be carried by robots of such robotic inventory handling system, including by lift-robots, floor-robots, or the like. Each shelving unit may comprise a vertical array of shelves on which containers (referred to as "totes") are placed. Floor robots (referred to also as "ground robots") may be configured to travel among the shelving units along paths on the floor. Separately and independently of the floor robots, Lift robots may be configured to move along horizontal and vertical paths in vertical planes over the vertical faces of the shelving units. The lift robots may be configured to remove and transfer containers from the shelves to the floor robots, and vice versa, while the floor robots may be configured to convey the containers from the shelving units to a packing station and deliver containers to the floor robots for placement on the shelves.

In some exemplary embodiments, the movement paths of the two types of robots—lift robots on the faces of the shelving units and floor robots below—is required to be coordinated in order to that the associated robots meet at the same location at the same time to perform the exchange. Such coordination requires great efforts, complicated route planning, and even creating bottlenecks making the process more complicated and less efficient. As an example, in order to bring a tote to a touch point or an assembly station (i.e., a location in which the items are moved between totes, such as a packing station, order assembly station, or the like), a lift robot is required to collect the tote from the respective shelving unit, move until reaching a floor robot, transfer the tote to the floor robot which takes the tote to the touch point.

Another technical problem dealt with by the disclosed subject matter is to speed the process of handling a customer order, and to decrease the human intervention required by workers in stores or warehouses. In some exemplary embodiments, inventory handling system may utilize a robot operation for each item in the customer order. As an example, for an order comprising two items, a lift robot may be configured to bring the container comprising the first item to a floor robot. The floor robot may be configured to transfer the first container to a packing station where a worker may collect the first item therefrom and place it in an order container. The floor robot may then take the first container back and transfer it to the lift robot to transfer it back to the shelving unit. Then, a lift robot (the same lift robot or another lift robot) may be configured to bring the container comprising the second item to a floor robot (the same or different one). The floor robot may be configured to transfer the second container to the packing station where the worker may collect the second item therefrom and place it in the order container. The floor robot may then take the second container back and transfer it to the lift robot to transfer it back to the shelving unit. Such process requires a great amount of robot operations and human worker effort.

Yet another technical problem dealt with by the disclosed subject matter is to enable an efficient automatic items arrangement in inventory handling, both for storage and for order handling, that ensures preserving the completeness and the quality of the picked items. In some exemplary embodiments, a single order may comprise different types of items being packed together in a single shopping tote to be stored or sent to the customers. The different types may have different properties, such as shape, weight, recommended storing temperature, fragility, or the like. In order to prevent damaging some items, the ordered items may be required to be arranged in accordance with such properties, such as keeping refrigerated items in temperature saving containers, putting delicate items on the top of the container, or the like. Such operation is usually performed manually by human employees, consuming manpower and time and being less efficient.

One technical solution is to utilize a movable picking station for picking pickable items from the containers and arranging them in an order container or providing them to a manned or automatic assembly station. In some exemplary embodiments, a movable picking station may be capable of moving items from an inventory container or tote to another container, such as for example, an order container when fulfilling an order, or another inventory container when placing the item on shelves.

In some exemplary embodiments, the movable picking station may be configured to moves the items collected thereby to a container placed on a floor robot. Additionally or alternatively, the movable picking station may move an item from one inventory container to a second container. When the second container is moved to a packing station it may contain multiple order items. The movable picking stations may be used to assemble the order container, move items between containers, or the like. The movable picking stations may be used as a buffer between the lift robots and the floor robots, moving items between floor robots, or the like.

In some exemplary embodiments, multiple movable picking stations may be deployed autonomously within the same center. Each movable picking station may be configured to handle a customer order or a portion thereof. One or more movable picking stations may handle the same customer order, such as different portions of the same order.

In some exemplary embodiments, the movable picking station may be configured to pick a subset of the items of the customer order and move them from one container to another. Given an order composed of N items, with M of them, M<N, being pickable, e.g., can be transferred with a movable picking station. A movable picking station may be configured to collect the M pickable items from the different inventory containers and put all those M items in one order container and get it to the touch point. Accordingly, the number of containers that are transferred to the touch point is 1 for all the M pickable items that the movable picking station can handle, plus N−M containers that comprise the other N−M items that the movable picking station cannot (or did not) handle. As an example, given an order of 15 items that 10 of them can be picked by the movable picking station, the number of containers that will get to the packing station is 1 plus 15-10 for a total of 6 instead of 15. A considerable saving both in human time in the packing station and in floor robot movements.

In some exemplary embodiments, the order of picking pickable items by the movable picking station may be determined based on features of the items, such as hardness, temperature, or the like. As an example, the movable picking station may be configured to start with hard items such as cans, to be placed at the bottom of the container. Additionally or alternatively, the order of assembling the items may be performed in accordance with the operation of the movable picking station. Pickable items that the movable picking station can handle may be first assembled in a one container by the movable picking station, while the rest of the items are placed in the picking station (manned or automatic) on the top of the order container. Such may ensure that the hard items that are generally pickable by the moveable picking station are placed at the bottom of the order container and may not damage the rest of the items.

Additionally or alternatively, instead of putting the pickable items in one container and sending them to the packing station, they may be added to the container comprising the "non-pickable" items. The inventory handling system may prepare an order container with the non-pickable items, and the movable picking station may be configured to add the pickable items to the order-container. As an example, assuming the order includes 4 items: a tuna can and an onion (pickable) and banana and tomato (not pickable). In one exemplary embodiment, three containers may be sent to the packing station, one with the tuna can and the onion (all the pickable items), one for the banana and one for the tomato. In another exemplary the tuna can and the onion may be added on the top of the banana (if decided as safe), then only two containers may be sent to the packing station. If all the items are pickable, the order container can be assembled without ever getting to a touch point or manned piking station.

Additionally or alternatively, the moveable picking stations may be utilized to arrange items in the storage system. The moveable picking stations may be configured to pick and place items from one inventory container to another. In some exemplary embodiments, the moveable picking stations may be utilized to perform smart merge tasks to better utilize the volume of the storage facility. As an example, products of different types that are placed in different containers or even different departments, and are often purchased together (such as for example tomato sauce and pasta, mops and floor cleaning material, or the like) may be collected by the moveable picking stations into combined containers.

One technical effect of utilizing the disclosed subject matter is increasing the throughput of inventory handling systems or retailers' distribution centers. The disclosed subject matter enables to buffer different lift robot and floor robots separately and independently, without the need to wait to each other, or coordinate the moves, match their schedules, or the like. As an example, when a lift robot gets a container to a location that the movable picking station can pick an item therefrom, the lift robot may not wait for a floor robot to receive the container. Instead, the lift robot may continue moving to return the container and bring other items. Additionally or alternatively, the movable picking station may be configured to directly pick the items from the lower shelves, without the need of other robots. Lift robots may only bring the relevant containers to the lower shelves where the movable picking stations can pick the items, thus eliminating the need of floor robots.

Another technical effect of utilizing the disclosed subject matter is improving the operation of robotic inventory handling systems by a considerable saving in lift and floor robots' movements and distance travel floor robot. Instead of the situation that each container for each item in the order be moved by a floor robot all the way from the shelf in the shelving unit to the packing station and back, the disclosed subject matter enables picking the item while the container is on the shelf or in other location within the shelving unit. Decreasing the distance, the floor robots travel and the movements of both the floor robots and lift robots, does not only enhance the total throughput of the inventory handling system, but also saves time and energy, provides a safer packing process. Furthermore, items that are located in containers on the lower shelves may not require to be moved a lift robot at all, and may directly be picked by movable picking stations located in the lower shelf plane or on floors robot, thereby improving the overall throughput of the inventory handling system.

Yet another technical effect of utilizing the disclosed subject matter is reducing the human work in manned packing station or touch points. Using the movable picking stations, less containers arrive to the manned packing stations. The few containers that do arrive to the manned packing station may comprise multiple items of multiple types that are already arranged in a safe manner and may not require additional effort from the workers. The human workers may add non-pickable items to containers that already comprise the pickable items picked by the movable picking stations, without moving or touching the pickable items. The movable picking stations may enable great flexibility in deploying robotic supermarkets or warehouses.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1B:
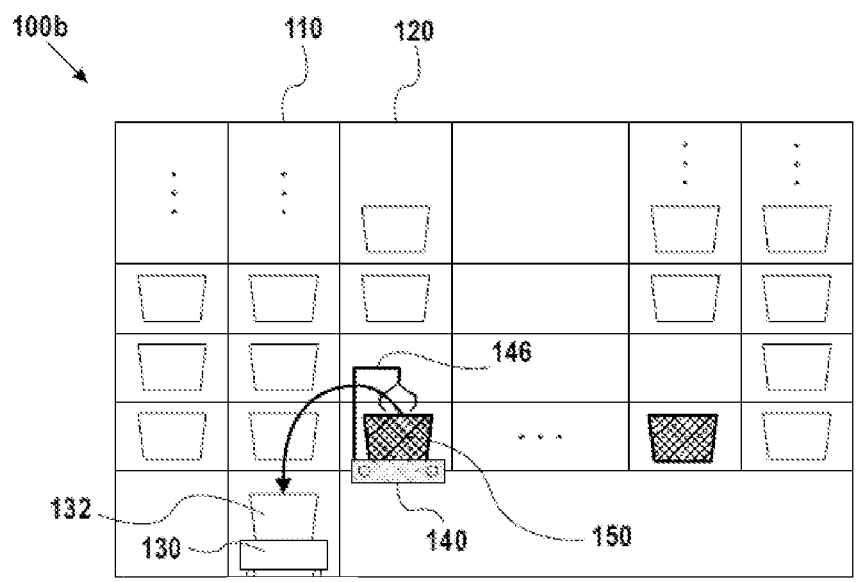

Referring now to FIGS. 1A and 1B showing schematic illustrations of an exemplary environment and architecture in which the disclosed subject matter may be utilized, in accordance with some exemplary embodiments of the disclosed subject matter.

In some exemplary embodiments, 100a and 100b may be illustrations of a portion of an inventory handling center or an automated distribution center for picking and packing of items, such as but not limited to grocery items, in response to customer orders. In some exemplary embodiments, Center 100a may comprise multiple shelving units (such as 110 and 120) for mounting over a horizontal floor. Each shelving unit may be mounted on the floor itself or suspended above it. In some exemplary embodiments, Center 100b may comprise multiple shelving units 22, which are mounted side-by-side over a horizontal floor. Center 100b or a portion thereof may comprise Center 100a, similar thereto, or the like.

In some exemplary embodiments, Shelving Units 110 and 120 may be mounted on the floor by legs, suspended from the ceiling, held above the floors by any suitable means that are known in the art, or the like. For clarity and convenience in the description that follows, the horizontal plane of the floor is taken to be the X-Y plane, with the X-axis running along the length of Shelving Units 110 and 120. The vertical faces of Shelving Units 110 and 120 are thus taken to be X-Z planes.

In some exemplary embodiments, each shelving unit may comprise a vertical array of shelves (such as Shelf 111) on which containers (such as Container 112) are placed. It is advantageous, although not mandatory, that the containers be of identical sizes and shapes. Each container may be configured to hold or store a certain type of inventory item or possibly a number of different types of inventory item. A central server (not shown) may be configured to track the contents of the containers and their respective location in order to plan and direct the operations of the robots and personnel in Center 100*a* (and 100*b*).

In some exemplary embodiments, a Floor Robot 130 may be configured to travel among the shelving units along paths on the floor, such as on X and Y directions. Floor Robot 130 may be configured to carry a Container 132, such as containers provided thereto from the shelving units, order containers that are designated to store items to be packed to the customers, or the like. Floor Robot 130 may be configured to convey the containers from the shelving units to a packing station and deliver containers thereon for placement on the shelves.

In some exemplary embodiments, separately and independently of Floor Robot 130, a Movable Picking Station 140 may be configured to move along horizontal and vertical paths in vertical planes over the vertical faces of the shelving units, such as on X and Z directions. Movable Picking Station 140 may be configured to move in the gaps between the shelving units, such as Gap 105 between Shelving Unit 110 and Shelving Unit 120. Movable Picking Station 130 may be configured to pick and transfer items between containers on the shelves and or Container 132 on Floor Robot 130, and vice versa. It may be noted that Movable Picking Station 140 may be structurally different than Floor Robot 130, may have similar properties, may be adapted to engage one to another, or the like.

In some exemplary embodiments, Movable Picking Station 140 may comprise a bottom floor Platform 142 capable of being attached to lowest shelves in the adjacent shelving units, such as in Points 144. Movable Picking Station 140 or specifically bottom floor Platform 142, may be capable of sideways motion in the gap along the lowest shelves. Additionally or alternatively, Movable Picking Station 140 may capable of picking items from containers in the shelving unit, such as via a Robotic Arm 146 or any other robotic manipulator, and place it in another container on the shelving unit or in an appropriately placed container on a robot such as on Container 132 on Floor Robot 130.

In some exemplary embodiments, Movable Picking Station 140*b* may be implemented as a robot placed within the lowest shelf in a shelf unit. Such robot may be similar to lift robots and may move along the same track over the shelving units, vertically and horizontally.

In some exemplary embodiments, Floor Robot 130 may be configured to travel among Shelving Units 110 and 120 horizontal paths on the floor, moving independently of but in coordination with Movable Picking Station 140. Movable Picking Station 140 may be configured to transfer items to Container 132 on Floor Robot 130. Additionally or alternatively, Movable Picking Station 140 may be configured to transfer the items to an order Container 150 located on a shelf, that may be later transferred (such as by a lift robot) to Floor Robot 130 which then convey it from the shelving units to a specified destination.

In some exemplary embodiments, order Container 150 may be utilized to assemble all the items that may be delivered to the customer. Each order container may be used to fulfil a different order. In some exemplary embodiments, Container 150 may be of the same dimensions as inventory Containers 132. Container 150 may comprise barriers therein to enable to place items in different compartments in accordance with properties of the items.

In the pictured embodiments, legs Shelving Units 110 and 120 are high enough so that Floor Robot 130 can travel beneath the shelves in order to deliver Container 132 (or Container 150) to their destinations, such as to a packing station, where a picker (not shown) moves items from the containers to a box or cartons for delivery to customers. Similarly, Floor Robot 130 may be configured to convey Container 132 to a lift robot for placement on the shelves.

Figure 2A:
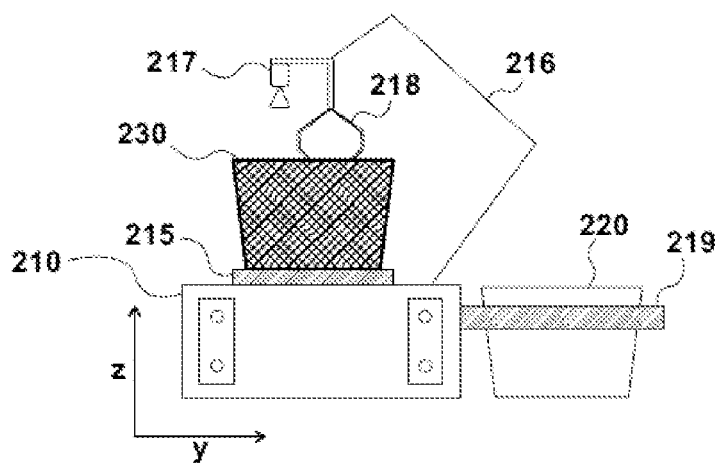
FIGS. 2A-2D show schematic illustrations of an exemplary environment and architecture, in accordance with some exemplary embodiments of the disclosed subject matter.

Referring now to FIG. 2A showing a schematic illustration of an exemplary environment and architecture in which the disclosed subject matter may be utilized, in accordance with some exemplary embodiments of the disclosed subject matter.

In some exemplary embodiments, Movable Picking Station 210 may be a variation of a lift robot. As an example, Movable Picking Station 210 may be placed on a lift robot, may be embedded in a lift robot, may be an adapted lift robot, or the like. Movable Picking Station 210 may be configured to pick an item from a first container, such as Inventory Container 230 and put it in a different container, such as Order Container 220 (or any order container placed on a floor robot), or a different inventory container (e.g., a container placed on a shelf). Movable Picking Station 210 may be capable of Y-Z motion.

In some exemplary embodiments, Movable Picking Station 210 may comprise a picking-able lift Platform 215, configured to carry a container (such as Container 230) or other order container. Movable Picking Station 210 may be capable of lifting the container and hand it to another robot, put it on a shelf, or the like. Additionally or alternatively, Movable Picking Station 210 may be equipped with vision aided Robotic Arm 216. Robotic Arm 216 may comprise a Camera 217 or any other vision sensor, and a Gripper 218 having a puller mechanism to extract inventory containers from their location and fulfil order containers to later hand those to the floor robots. Robotic Arm 216 may comprise other sensors providing additional capabilities thereto, such as weight sensors, temperature sensors, or the like. Additionally or alternatively, Gripper 218 may be configured to extract an item from an inventory container and move it to another inventory container, order container or the like.

Additionally or alternatively, Platform 215 may comprise a puller configured to pull containers from the shelving unit. Platform 215 may comprise a Secondary Holder 219, such as positioned in the side thereof, to allow carrying a container. Robotic Arm 216 may be configured to pick up an item from the top of the pulled container and place it within the container carried by Secondary Holder 219, or vice versa.

Additionally or alternatively, other implementations may be utilized as Platform 215. As an example, Platform 215 may be an independent robot, may be a portion of a lift robot, may be an addition to the shelving unit, or the like.

Figure 2B:
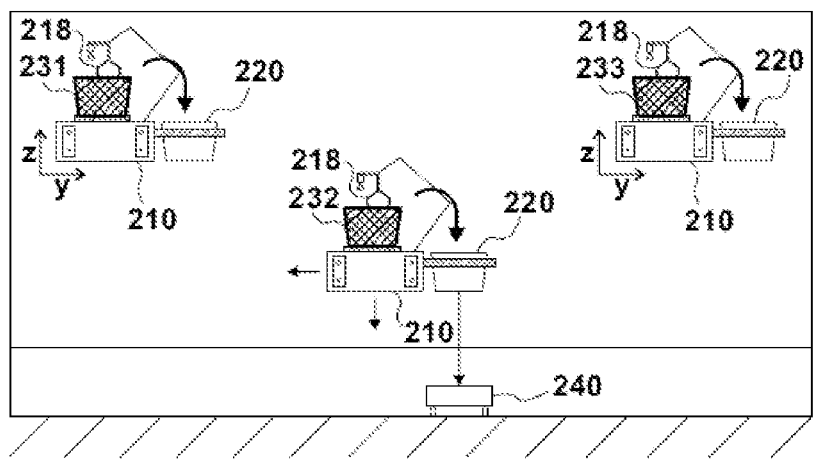

Referring now to FIG. 2B showing a schematic illustration of an exemplary environment and architecture in which the disclosed subject matter may be utilized, in accordance with some exemplary embodiments of the disclosed subject matter.

In some exemplary embodiments, Movable Picking Station 210 may be configured to move along the shelving units (in a Y-Z motion) and collect items from different inventory containers in accordance with a customer order. As an example, Movable Picking Station 210 may move toward the shelf storing Container 231. Platform 215 may pull Container 231 from the shelf and Robotic Arm 216 may be pick up an item from the top of Container 231 and place it within Container 220 carried by Secondary Holder 219. Then, Movable Picking Station 210 may move from the shelf storing Container 231 to the shelf storing Container 232, Platform 215 may pull Container 232 from the shelf and Robotic Arm 216 may be pick up an item from the top of Container 232 and place it within Container 220 above the item picked from Container 231. Similarly, Movable Picking Station 210 may then move to Container 233 to collect the third item.

In some exemplary embodiments, upon Movable Picking Station 210 finishing to pick the items of the order, a Floor Robot 240 may be configured to receive fulfilled Container 220 from Movable Picking Station 210 and transfer it to an assembly station.

Figure 2C:
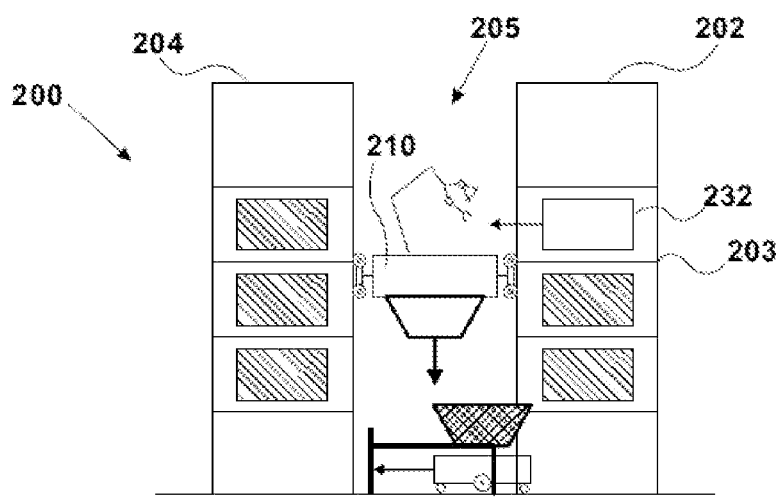

Referring now to FIG. 2C showing a schematic illustration of an exemplary environment and architecture in which the disclosed subject matter may be utilized, in accordance with some exemplary embodiments of the disclosed subject matter.

In some exemplary embodiments, a Center 200 may be a portion of an inventory handling center or an automated distribution center for picking and packing of items. Center 200 may be similar to Center 100a and Center 100b illustrated in FIGS. 1A and 1B.

In some exemplary embodiments, Movable Picking Station 210 may be configured to move along vertical and horizontal paths in planes that are defined by the vertical faces of Shelving Units 201 and 202, within Gap 205 between adjacent Shelving Units 201 and 202. Upon reaching the location of a given Container 232, Movable Picking Station 210 may be configured to pull Container 232 from its Shelf 203, and carry it using Platform 215. In similar manner, Movable Picking Station 210 may be configured to re-fill containers on the shelves with corresponding items or products.

It may be noted that although only a single, simplified Movable Picking Station 210 is shown in FIG. 2C, in practice multiple movable picking stations or other lift robots may be deployed among Shelving Units 201 and 202 and move independently of one another in respective Gap 205 between adjacent Shelving Units 201 and 202, or other gaps between other adjacent shelving units. In some embodiments, for enhanced throughput, two or more movable picking stations and lift robots may operate and travel autonomously along separate paths within the same gap.

In some exemplary embodiments, Movable Picking Station 210 may be configured to move along predefined paths within Gap 205 while engaging the vertical faces of one or both of the Shelving Units 201 and 202. Movable Picking Station 210 may thus be able to access containers in Shelving Units 201 and 202 on both opposing sides of Gap 205. The gaps in Center 200 may have a predefined, well-controlled width, which enables Movable Picking Station 210 to move while engaging the vertical faces of the shelving units on both sides of the gaps.

Additionally or alternatively, Movable Picking Station 210 may be configured to move over a single vertical face of Shelving Units 201 and 202, without necessarily engaging another, opposing shelving unit. Movable Picking Station 210 may be mounted on a special framework, engaged to a lift robot, or the like.

In some exemplary embodiments, combining the former layout with buffer locations to decouple the Lift Robot and the Ground Robot missions, may be optional and may provide further optimization.

Figure 2D:
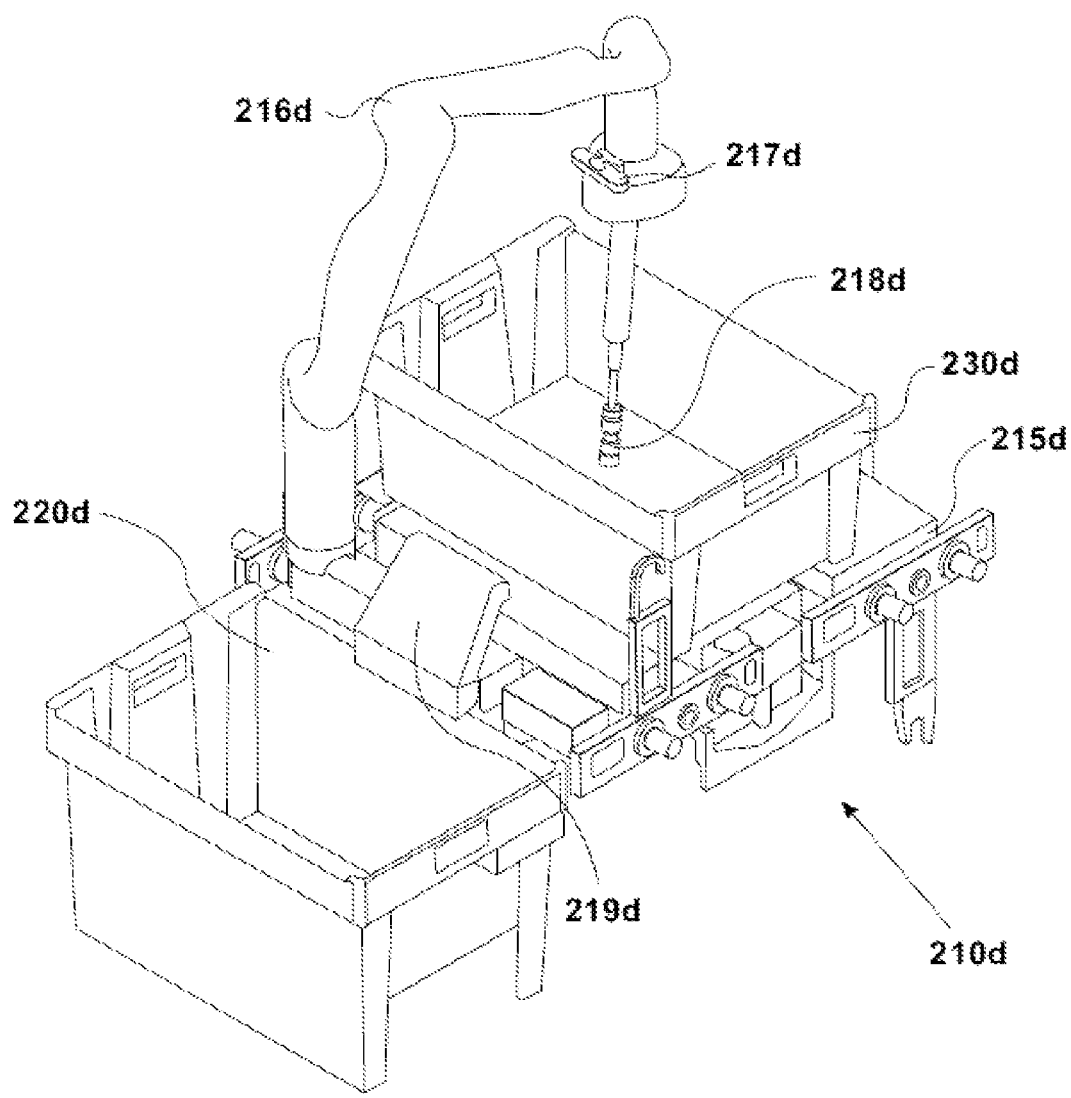

Referring now to FIG. 2D showing a schematic illustration of an exemplary environment and architecture in which the disclosed subject matter may be utilized, in accordance with some exemplary embodiments of the disclosed subject matter.

In some exemplary embodiments, Movable Picking Station 210d may be configured to move along the shelving units (in a Y-Z motion) and collect items from different inventory containers in accordance with a customer order. Movable Picking Station 210d may be similar to Movable Picking Station 210 illustrated in FIG. 1A.

In some exemplary embodiments, when Movable Picking Station 210d arrives adjacent to the shelf storing Container 230d, Robotic Arm 216d may be utilized to pick Container 230d from its storage location by Gripper 218d and place it on Platform 215d (similar to Platform 215), or in other location close to Movable Picking Station 210d, such as an edge of the shelf. Movable Picking Station 210d may be configured to utilize Vision Sensor 217d to identify Container 230d, such as by scanning a barcode thereof, identifying an identification number or a tag thereon, or the like.

In some exemplary embodiments, Robotic Arm 216d may be configured to pick up an item from the top of the pulled Container 230d using Gripper 218d and place it within the Container 220d carried by Secondary Holder 219d, or vice versa.

Figure 3A:
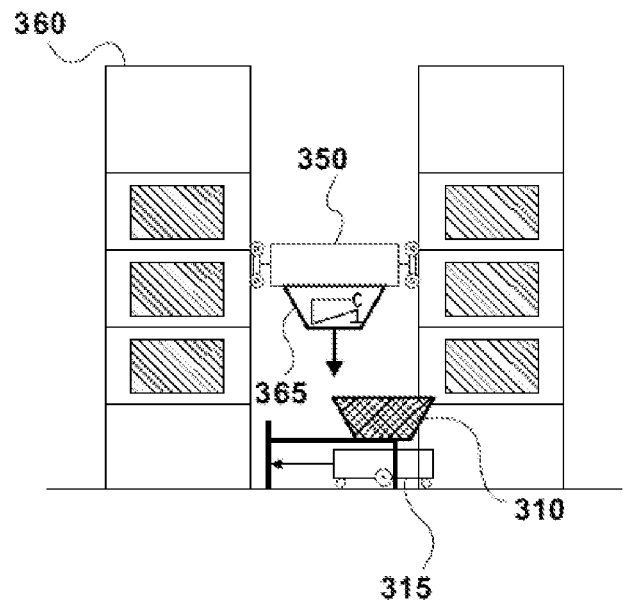
FIGS. 3A-3C show schematic illustrations of an exemplary environment and architecture, in accordance with some exemplary embodiments of the disclosed subject matter.

Referring now to FIG. 3A showing a schematic illustration of an exemplary environment and architecture in which the disclosed subject matter may be utilized, in accordance with some exemplary embodiments of the disclosed subject matter.

In some exemplary embodiments, Movable Picking Station 310 may be a container that can be carried by floor robots and lift robots. Movable Picking Station 310 may be configured to pick items from containers next thereto and transfer the items to a container carried thereby or to other containers. Movable Picking Station 310 may be configured to move items from one container to another, while the containers are kept at their locations, such as in a shelving unit, on floor robots, or the like.

In some exemplary embodiments, a Lift Robot 350 may carry Movable Picking Station 310 and travel with it over Shelving Units 360. Movable Picking Station 310 may pick items from containers while the containers are kept on the shelves of Shelving Unit 360. Then, Lift Robot 350 may transfer Movable Picking Station 310 back to Floor Robot 315. Floor Robot 315 may transfer Movable Picking Station 310 or the container carried thereby to a manned or automatic picking station, such as Buffer Location 300c.

Additionally or alternatively, Movable Picking Station 310 may remain static on Floor Robot 315, or on a lower shelf at Shelving Unit 360, or the like, while Lift Robot 350 brings the relevant inventory containers such as Inventory Container 365 closed thereto. Movable Picking Station 310 may pick the item from Inventory Container 365 without moving from its location, then Lift Robot 350 returns Inventory Container 365 back to its location on Shelving Unit 365.

Figure 3B:
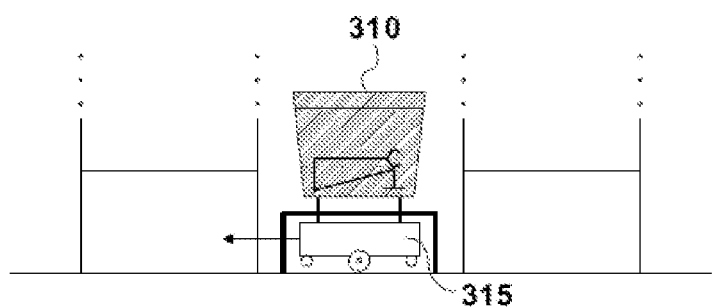

Referring now to FIG. 3B showing a schematic illustration of an exemplary environment and architecture in which the disclosed subject matter may be utilized, in accordance with some exemplary embodiments of the disclosed subject matter.

In some exemplary embodiments, Lift Robot 350 may be configured to bring the relevant inventory containers to the lower shelf at Shelving Unit 360. Movable Picking Station 310 may pick the item from Inventory Container 365 without moving from its location, then Lift Robot 350 returns Inventory Container 365 back to its location on Shelving Unit 360.

Figure 3C:
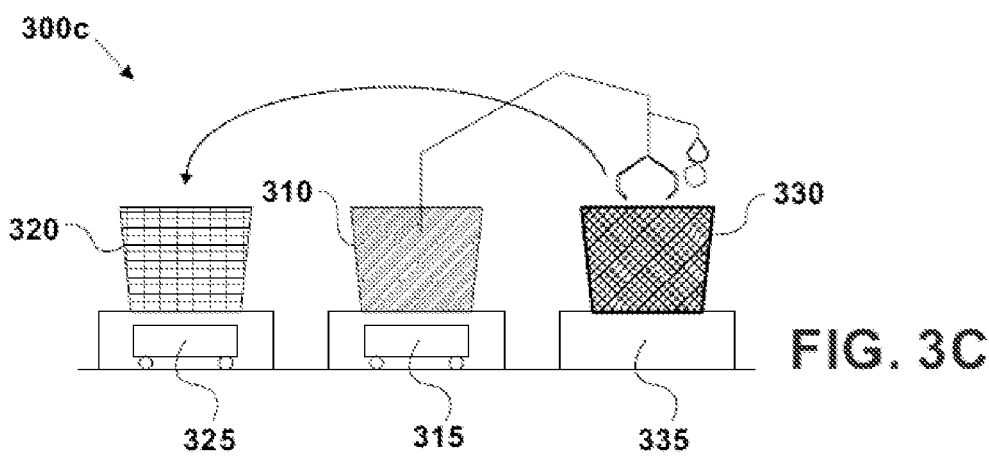

Referring now to FIG. 3C showing a schematic illustration of an exemplary environment and architecture in which the disclosed subject matter may be utilized, in accordance with some exemplary embodiments of the disclosed subject matter.

In some exemplary embodiments, a lift robot may bring an Inventory Container 330 to Buffer Location 300c. Buffer Location 300c may be a manned touch point, an automatic touch point, or the like.

A Floor Robot 315 may bring Movable Picking Station 310 next to Inventory Container 330. Another Floor Robot 325 may bring Order Container 320 to position next to Movable Picking Station 310. Movable Picking Station 310 may transfer items from Inventory Container 330 to Order Container 320.

Additionally or alternatively, after Movable Picking Station 310 finishes picking all the pickable items and put them in Order Container 320, Floor Robot 325 may transfer Order Container 320 to a manned touch point, where a worker may select and pick the non-pickable items and add them to Order Container 320. Then Floor Robot 325 may deliver Order Container 320 to the shipping apparatus (such as a truck or distribution center or the like) to be delivered to the end-client.

It may be noted that although certain particular designs of lift robots, floor robots and movable picking stations have been shown and described above, the principles of the above described systems may similarly be implemented using robots of alternative design, based on the sorts of propulsion mechanisms that are embodied in these robots or on other principles of propulsions that will be apparent to those skilled in the art after reading the above description. All such alternative implementations are considered to be within the scope of the present invention.

Figure 4A:
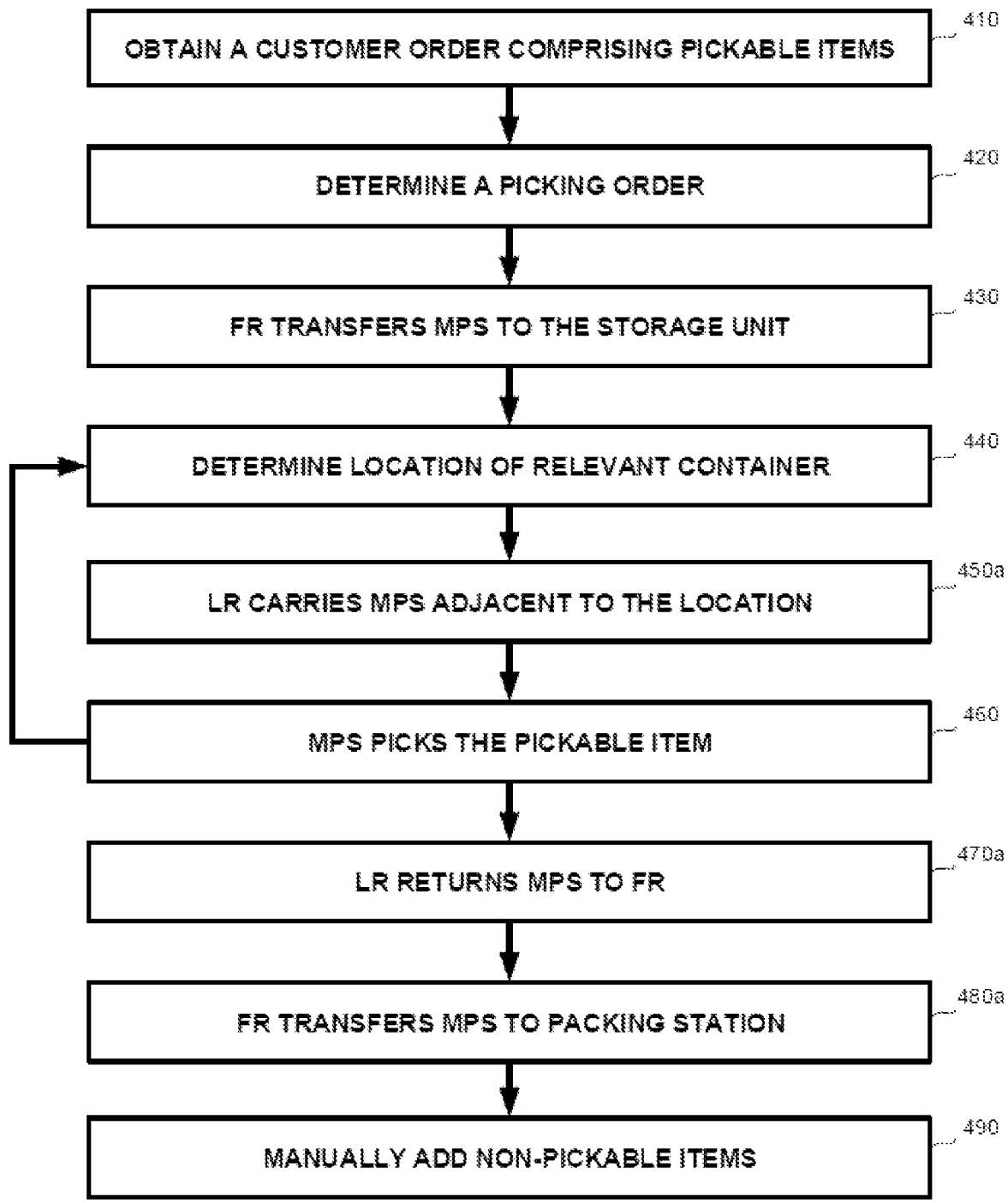
FIGS. 4A-4C show flowchart diagrams of methods, in accordance with some exemplary embodiments of the disclosed subject matter.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior a Referring now to FIG. 4A showing a flowchart diagram of a method, in accordance with some exemplary embodiments of the disclosed subject matter.

On Step 410, a customer order may be obtained. In some exemplary embodiments, the customer order may comprise a list of items to be picked from containers located on shelves in a storage unit comprising multiple shelving units, such as in an inventory or distribution center, a supermarket, a store, or the like. The items may comprise pickable items and non-pickable items. A pickable item may be an item that can be picked by a robot or a machine or the like, without requiring a human assistance.

On Step 420, a picking order may be determined. In some exemplary embodiments, the order of picking the pickable items may be determined based on the subset of pickable items within the customer order, such as based on the respective locations thereof, the weights or other properties.

On Step 430, a movable picking station may be transferred to the storage unit, such as using a floor robot. Additionally or alternatively, the movable picking station may be affixed to the storage unit.

On Step 440, a location of a designated container comprising the pickable item to be picked may be determined. In some exemplary embodiments, the location may be determined based on a storage map, an inventory list, or the like.

On Step 450a, a lift robot may carry the movable picking station adjacent to the location of the designated container. In some exemplary embodiments, the lift robot may collect the movable picking station from the floor robot, from another lift robot, or from other location in the shelving unit.

On Step 460, the movable picking station may pick the pickable item from the designated container and place it in the order container. In some exemplary embodiments, placing the pickable item in the order container may be in accordance with properties of the pickable item. As an example, pickable items above a predetermined weight, such as the average weight of items in the customer order, may be placed at the bottom of the order container. Additionally or alternatively, placing the pickable items by the movable picking station may be arbitrary, however affected by the picking order determined on Step 420. As an example, according to the picking order, the movable picking station may be configured to pick heavier items prior to lightweight items.

In some exemplary embodiments, Step 460 may be performed without moving the designated container from its location, with minimally moving the designated container, such as to an edge of the shelf the designated container is placed thereon, or the like. As an example, the lift robot may be configured to transfer the movable picking station within the gap between adjacent shelving units and hold it in front of the shelf of the designated container. The movable picking station may be configured to pick the pickable item, using a robotic arm, from the top of the designated container, while the latter being kept in location. Additionally or alternatively, the movable picking station may be configured to pull the designated container to the edge of the shelf, to placing in a platform, or the like, to enable more efficient picking of the item.

In some exemplary embodiments, Steps 440-460 may be repeated until all the pickable items are picked. Additionally or alternatively, multiple movable stations may be operated simultaneously to fulfil the same customer order. A combined order container may be utilized by the multiple movable stations. Additionally or alternatively, multiple order containers may be utilized and combined before being sent to the packing station, combined in the packing station, or the like.

On Step 470a, the lift robot may return the movable picking station to the floor robot.

On Step 480, when the movable picking station finishes picking all the pickable items, the floor robot may transfer the movable picking station to the packing station. Additionally or alternatively, the floor robot may collect the order container from the movable picking station (or the movable picking station may transfer the order container thereto) and transfer it to the packing station.

On Step 490, non-pickable items may be manually added to the order container. In some exemplary embodiments, when order container arrives to the packing station or other intermediate manned touch point, on the movable picking station or without it, the remaining non-pickable items that were not picked by the movable picking station may be added to the order container by workers. In some exemplary embodiments, inventory containers comprising the non-pickable items may be transferred to the packing station or the manned touch point by ground robots, where the workers picks the relevant items and place them in the order container. This method may reduce the travel of ground robots and work for the human workers in the manned touch point.

Figure 4B:
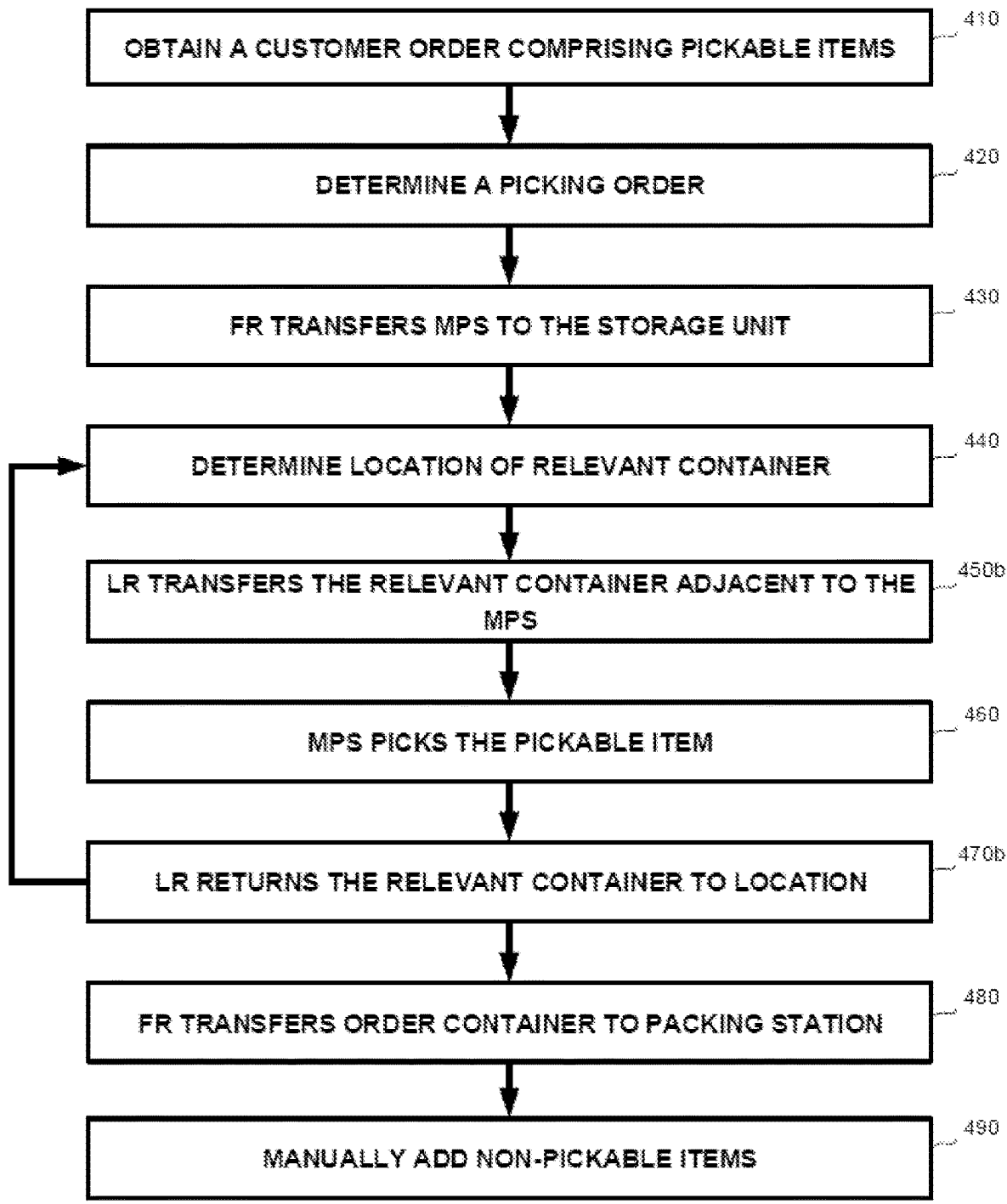

Referring now to FIG. 4B showing a flowchart diagram of a method, in accordance with some exemplary embodiments of the disclosed subject matter.

In some exemplary embodiments, instead of the lift robot carrying the movable picking station and moving it along the shelving units, the movable picking station may be kept on the floor, on the floor robot, on the bottom of the shelving unit, on a lower shelf of the shelving unit, or the like, while the lift robot bringing the designated containers thereto.

On Step 450b, a lift robot may arrive to the location of the designated container, and transfer the designated container to a location adjacent to the movable picking station. It may be noted, that the designated container is still in the area of the shelving units and not transferred to the packing station or other touch point, thus the distance the containers are being moved may be minimal.

In some exemplary embodiments, the lift robot may place the designated container on a lower shelf of the shelving unit to enable the movable picking station to pick the item therefrom (such as depicted in FIG. 1A). Additionally or alternatively, the lift robot may place the designated container on a designated platform associated with the movable picking station (such as depicted in FIG. 2A).

On Step 470b, when the movable picking station finishes picking the pickable item, the lift robot may return the designated container to its location in the shelving unit.

Figure 4C:
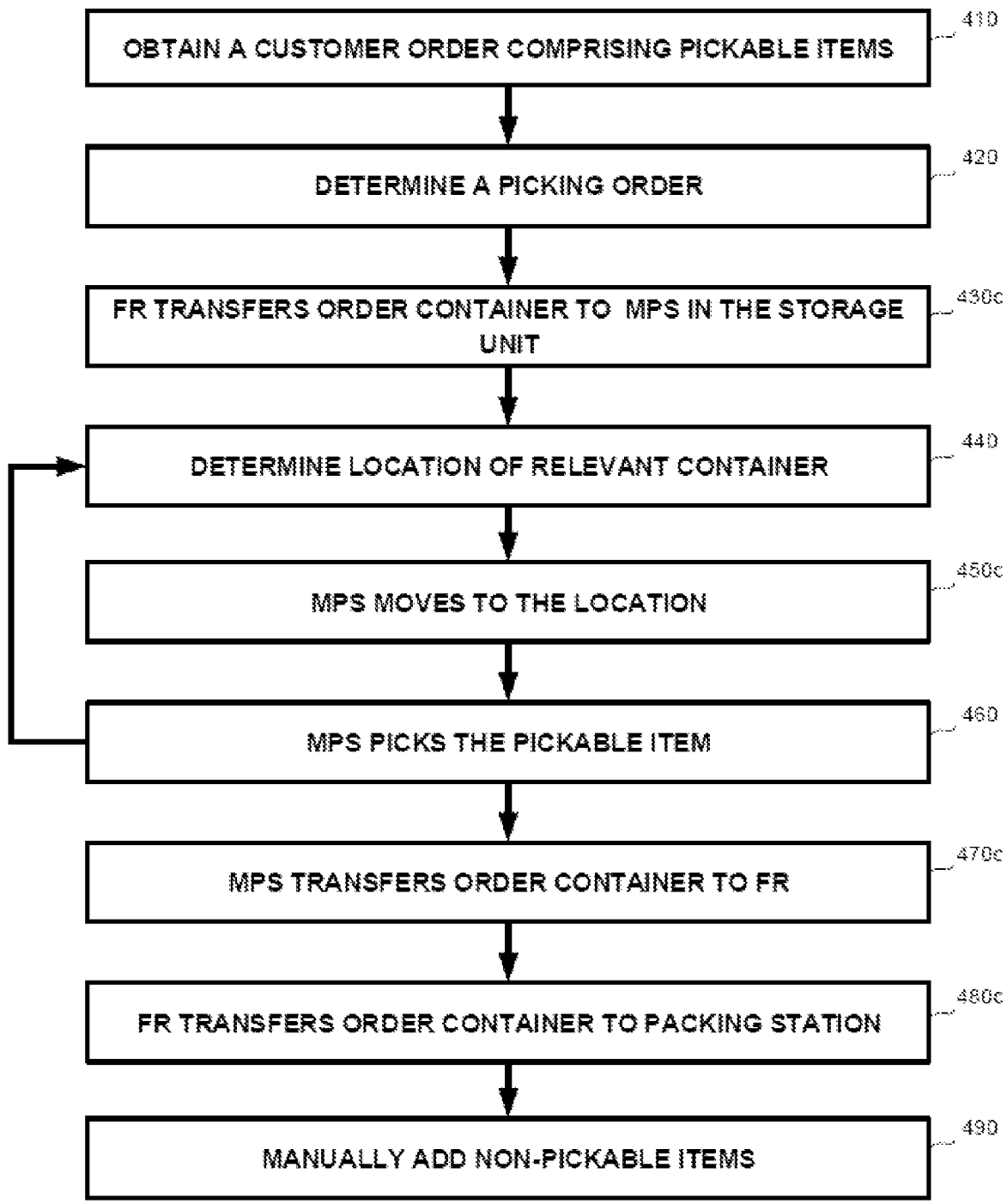

Referring now to FIG. 4C showing a flowchart diagram of a method, in accordance with some exemplary embodiments of the disclosed subject matter.

In some exemplary embodiments, the movable picking station may be configured to travel along the shelving unit in a similar manner as the lift robot, independently of any lift robot.

On Step 450c, the movable picking station may travel along the shelving units until reaching the location of the designated container. In some exemplary embodiments, movable picking stations may have two different modes of travel, along vertical and horizontal paths, respectively, in the vertical plane. To move from one location to another along the vertical face of a given shelving unit (or, in particular, in the gap between the faces of two adjacent shelving units), the movable picking stations may alternate between the two modes of travel and thus traverse paths consisting of vertical and horizontal path segments.

In some exemplary embodiments, the vertical face of each shelving unit may be defined by the horizontal front edges of the shelves and by vertical struts extending between these horizontal front edges. In some exemplary embodiments, the movable picking stations may engage these vertical struts when traversing the vertical path segments and engage the horizontal front edges of the shelves when traversing the horizontal path segments. As an example, toothed racks may be arranged along the vertical struts, and possibly along the horizontal front edges of the shelves, as well; and the movable picking stations may comprise pinions that engage these toothed racks in order to propel the lift robot along the corresponding path segments. As another example, the movable picking stations may comprise wheels that roll against the vertical struts and the horizontal front edges, while a winch, with a cable connected to the movable picking stations, raises and lowers the movable picking stations along the vertical path segments. As yet another example, the movable picking stations may comprise caterpillar treads, which engage the vertical struts and horizontal front edges of the shelves by frictional contact. As yet another example, the shelving units may comprise arrays of protrusions, such as cylindrical pins, which extend outward from the vertical faces. The movable picking stations in this case may comprise a chain guide and a chain, which may be fitted over the chain guide and engages the protrusions. The chain may be driven to rotate around the chain guide so as to propel the lift robot along the vertical and horizontal path segments. Alternatively, the shelving units may comprise arrays of holes or indentation, while the movable picking stations may have toothed wheels that rotate while engaging the holes.

On Step 460, the movable picking station may pick the pickable item from the designated container and place it in the order container, without moving the designated container from its location.

On Step 470c, the movable picking station may transfer the order container to the floor robot.

Additionally or alternatively, the order container may be embedded within movable picking station. As an example, the movable picking station may be a movable container itself, may carry the order container, may comprise a containing portion, or the like. The floor robot may transfer the movable picking station to the packing station where the order container is collected therefrom, or where the items may be moved to an order container.

It may be noted that the methods depicted in FIGS. 4A-4C may be utilized in a similar but opposite to arrange items in the storage system. The moveable picking stations may be configured, in accordance with one of the methods depicted in FIGS. 4A-4C, to pick and place items from one inventory container to another.

Figure 5:
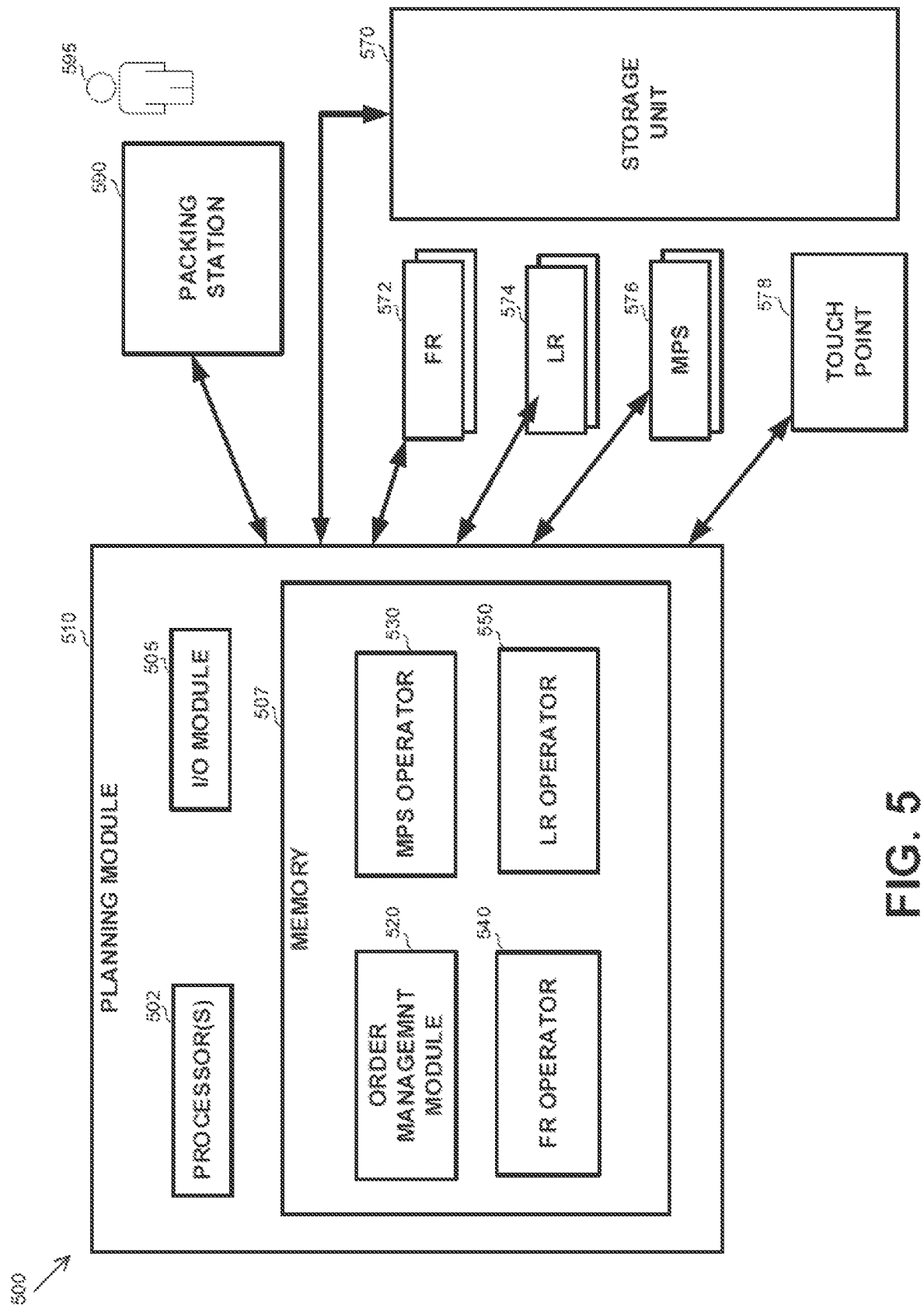
FIG. 5 shows a block diagram of a system, in accordance with some exemplary embodiments of the disclosed subject matter.

Referring now to FIG. 5 showing a block diagram of a system, in accordance with some exemplary embodiments of the disclosed subject matter.

A System 500 may be an inventory handling system. System 500 may be configured to support inventory handling and customer order fulfilment in a distribution center, in accordance with the disclosed subject matter.

In some exemplary embodiments, a Planning Unit 510 may be configured to plan and manage the operations of System 500, such as fulfilling customer orders, managing inventory of warehouses, managing a distribution center, or the like. Planning Unit 510 may be implemented in a central computer, a server, a cloud-based server, or the like.

In some exemplary embodiments, Planning Unit 510 may comprise one or more Processor(s) 502. Processor 502 may be a Central Processing Unit (CPU), a microprocessor, an electronic circuit, an Integrated Circuit (IC) or the like. Processor 502 may be utilized to perform computations required by Planning Unit 510 or any of it subcomponents.

In some exemplary embodiments of the disclosed subject matter, Planning Unit 510 may comprise an Input/Output (I/O) module 505. I/O Module 505 may be utilized to provide an output to and receive input from a user, such as, for example obtaining customer order, inventory mappings, or the like.

In some exemplary embodiments, Planning Unit 510 may comprise Memory 507. Memory 507 may be a hard disk drive, a Flash disk, a Random Access Memory (RAM), a memory chip, or the like. In some exemplary embodiments, Memory 507 may retain program code operative to cause Processor 502 to perform acts associated with any of the subcomponents of Planning Unit 510.

In some exemplary embodiments, a Planning Unit 510 may be configured to track execution of each task by each component of System 500 to determine when a next task can be executed.

In some exemplary embodiments, a Storage Unit 570 may store inventory items, such as grocery products, or any other type of products. The items may be arranged in Storage Unit 570 in a predefined order, such as on vertical shelves in multiple shelving units mounted over a horizontal floor, or any other storage order that enables movement of robots therein, such as storage unit having gaps between vertically arranged shelves that the robots can move therein. As an example, Storage Unit 570 may comprise multiple shelving units that are arranged over the floor side by side, with a predefined gap between the vertical faces of adjacent shelving units. The items may be stored in inventory containers, preferably in united shape and size, that can be carried by robots. Each type of inventory item may be stored in a different inventory container. Additionally or alternatively, different types of items, that may commonly be ordered together, such as pasta and tomato sauce cans, may be stored in the same inventory container. Each container may have an identifier and predetermined location and may be tracked by Planning Module 510 to plan and direct the operations of the robots and personnel in distribution center. Planning Module 510 may be configured to automatically identify the location of the respective container storing each item.

In some exemplary embodiments, one or more Floor Robots 572 may be configured to move on the floor in any direction (e.g., on X and Y directions). Floor Robot 572 may be configured to carry a container, such as an order container, an inventory container or the like. Additionally or alternatively, Floor Robot 572 may be configured to carry a movable picking station (such as Movable Picking Station 576) within Storage Unit 570, transfer the containers or the movable picking stations between Storage Unit 570 and Packing Station 590, or the like.

In some exemplary embodiments, one or more Lift Robots 574 may be configured to transport containers vertically and horizontally in Storage Unit 570 (e.g., on X and Z directions), such as between different shelves, putting a container on a floor robot, or the like. Lift Robots 574 may be configured to move while being suspended above the ground in Storage Unit 570. Lift Robots 574 may be configured to move along predefined path in a vertical plane over a vertical face of the one of the shelving units in Storage Unit 570.

Additionally or alternatively, Lift Robot 574 may be configured to carry a movable picking station (such as Movable Picking Station 576) within Storage Unit 570, and transfer it to different locations within Storage Unit 570. As an example, Lift Robot 574 may be configured to carry Movable Picking Station 576 over the vertical faces of the shelving units to enable Movable Picking Station 576 to pick items from containers stored in the shelving units while being carried by Lift Robot 574.

Additionally or alternatively, Lift Robot 574 may be configured to transfer containers from the shelves to the bottom of the shelving units, to enable Movable Picking Station 576 to pick items from transferred containers without the transferred containers leaving the shelving units.

It may be noted that the different types of robots, such as Floor Robots 572, Lift Robots 574 and Movable Picking Station 576, may be configured to move, independently of each other. The different types of robots (or a portion thereof, such as Lift Robots 574 and Movable Picking Station 576) may be configured to move independently along the shelving units within the gap, while engaging to the shelving units on at least one side of the gap. The different types of robots (or a portion thereof, such as Lift Robots 574 and Movable Picking Station 576) may be configured to disengage autonomously from the vertical faces of the shelving units, to move to other types of robots (such as onto Floor Robots 573), move (or being transferred) from one gap to another gap, from one shelving unit to another, autonomously reengage with the vertical faces of the shelving units in the other gap, or the like.

In some exemplary embodiments, one or more Touch Points 578 may be a location in which items may be moved between containers. In some exemplary embodiments, the order may be assembled in Touch Points 578. In some exemplary embodiments, Touch Point 578 may be utilized as a picking station in which items can be picked from containers and placed in other containers. Additionally or alternatively, Touch Point 578 may be a packing station, may be similar to Packing Station 590, embedded within Packing Station, or the like.

In some exemplary embodiments, one or more Movable Picking Stations 576 may be a robot capable of picking and placing missions. In some exemplary embodiments, Movable Picking Station 576 may be a mobile touch point capable of moving of its own, or be carried by other robots such as Floor Robot 572 and Lift Robot 574. Additionally or alternatively, Movable Picking Station 576 may be configured to move autonomously and independently of the other robots. Additionally or alternatively, Movable Picking Station 576 may be a movable container that in addition to storage compartments may be equipped with robotic tools enabling movement, picking and placing motions, or the like. Additionally or alternatively, a container or other storage compartment may be embedded within Movable Picking Station 576. In some exemplary embodiments, Movable Picking Station 576 may be configured to travel in Storage Unit 570 such as among the shelving units therein, in predefined paths in accordance with the means of storing the products or in accordance with other aspects of the design of Storage Unit 570, or the like. As an example, Movable Picking Station 576 may be configured to travel horizontally along a bottom of the shelving units. Movable Picking Station 576 may be configured to transfer items between containers, such as using robotic arms, handles, or any other additional equipment, such as visual sensors or the like. As an example, Movable Picking Station 576 may comprise a robotic arm configured to be extended through the vertical face of the one of the shelving units and to pick an item from a designated container while the designated container is stored in the shelving units. As another example, Movable Picking Station 576 may comprise a vision sensor configured to capture an inside view of the designated container. As yet another example, Movable Picking Station 576 may comprise a gripper configured to extract an item from the designated container and move the item to the order container.

In some exemplary embodiments, Movable Picking Station 576 may be configured to collect into an order container (not shown) at least a portion of a plurality of items listed in an order. The order container may be comprised by Movable Picking Station 576, carried thereby, carried by another robot, located on a predetermined location in the shelving unit, or the like.

In some exemplary embodiments, Order Management Module 520 may be configured to analyze customer order, identify pickable items therein, identify locations of the containers storing the items, or the like. Additionally or alternatively, Order Management Module 520 may be configured to identify the subset of items that can be carried or picked by Movable Picking Station 576.

In some exemplary embodiments, Order Management Module 520 may be configured to determine a sequence of picking tasks for Movable Picking Station 576. The sequence of picking tasks may be determined based on properties of items of an order. Order Management Module 520 may be configured to cause placement of items within the order container in an optimal manner, such as in an order that avoids crushing of previously placed items by newly placed items, or the like.

In some exemplary embodiments, Order Management Module 520 may be configured to determine, based on properties of the items in the customer order, an order of picking the items. The properties and types of the items to be picked may set a partial picking order therebetween. As an example, hard items may be picked and placed in the order container before soft items. Additionally or alternatively, the pickable items may yield constraints on the picking or manner thereof, such as which items can be placed on top of each items (e.g., soft on hard, hard on hard, small on big, ordered based on size and weight, or the like), which items can be placed on the same level (e.g., in accordance with the X and Y dimensions thereof, due to Z dimension in an attempt to create same-height levels, or the like), or the like. Order Management Module 520 may be configured to determine potential picking order based on the constraints and select an optimal order of execution. The selection may be based on the location of the robots, the location of the relevant containers from which the items are picked, or the like. In some exemplary embodiments, a minimal rout by the movable picking station may be selected for the order container to be transferred and to place items therein, minimal potential work by Human Worker 395 at Packing Station 390, or the like.

In some exemplary embodiments, Movable Picking Station Operator 530 may be configured to operate Movable Picking Station 576 in Storage Unit 570, and Packing Station 590. Movable Picking Station Operator 530 may be configured to operate Movable Picking Station 576 to pick relevant pickable items from the relevant containers and place them in an order container, while minimizing the distance the containers being moved from the location.

In some exemplary embodiments, Movable Picking Station Operator 530 may be configured to operate Movable Picking Station 576 to travel among the shelving units of Storage Unit 570 to reach the location of the designated container Movable Picking Station Operator 530 may be configured to operate Movable Picking Station 576 to pick the relevant pickable item from the designated container, while the designated container stays at the location.

In some exemplary embodiments, Floor Robot Operator 540 may be configured to operate Floor Robots 572 in Storage Unit 570, and Packing Station 590. Floor Robot Operator 540 may be configured to operate Floor Robots 572 to travel in the horizontal floor among Storage Unit 570 along predefined paths. Additionally or alternatively, Floor Robot Operator 540 may be configured to convey Movable Picking Station 576 on Floor Robot 572 from a rendezvous point to Packing Station 578.

In some exemplary embodiments, Lift Robot Operator 550 may be configured to operate Lift Robots 574 in Storage Unit 570, and Packing Station 590. Lift Robot Operator 550 may be configured to operate Lift Robots 574 to transport Movable Picking Station 576, from a first location to a second location adjacent to the location of the designated container and from the second location to the rendezvous point.

Additionally or alternatively, Lift Robot Operator 550 may be configured to operate Lift Robots 574 to transporting the designated container, to a location adjacent to the movable picking station and back to their locations.

Although certain particular configurations of the robots and compatible shelving units are shown and described herein, the principles of the present invention may similarly be implemented using other shelving and robot designs. All such alternative designs are considered to be within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An inventory handling system, comprising:
multiple shelving units for positioning over horizontal floor, each shelving unit comprises a vertical array of shelves on which containers are placed, wherein at least a portion containers comprise items;
one or more floor robots, which are configured to travel on the horizontal floor, wherein the one or more flor robots are configured to transfer containers from the shelving units to one or more packing stations, and
one or more lift robots, which are configured to move independently of the one or more floor robots along paths in a vertical place over vertical faces of the shelving units, the vertical plane is orthogonal to the horizontal floor, the one or more lift robots are configured to be utilized in transferring the containers between the shelves and the one or more floor robots;
a moveable picking station, which is configured to transfer items between containers, the moveable packing station is configured to collect into an order container at least a portion of a plurality of items listed in the order, wherein the one or more lift robots are configured to carry the movable picking station over the vertical faces of the shelving units;
wherein the movable picking station is configured to pick items from containers stored in the shelving units while being carried by the one or more lift robots.

2. The inventory handling system of claim 1,
wherein the movable picking station is configured to travel horizontally along a bottom of the shelving units;
wherein the one or more lift robots are configured to transfer containers from the shelves to the bottom of the shelving units, whereby the movable picking station is capable of picking items from transferred containers without the transferred containers leaving the shelving units.

3. The inventory handling system of claim 1, wherein the multiple shelving units are arranged over the floor side by side, with a predefined gap between the vertical faces of adjacent shelving units, wherein the movable picking station is configured to move along the shelving units within the gap, wherein the movable picking station is configured, while moving within the gap, to engage the shelving units on at least one side of the gap.

4. The inventory handling system of claim 1, wherein the movable picking station comprises a robotic arm configured to be extended through the vertical face of the one of the shelving units and to pick an item from a designated container while the designated container is stored in the shelving units.

5. The inventory handling system of claim 4, wherein the movable picking stations comprises: a vision sensor configured to capture an inside view of the designated container; and a gripper configured to extract an item from the designated container and move the item to the order container.

6. The inventory handling system of claim 1, further comprising a planning unit, wherein the planning unit is configured to determine a sequence of picking tasks for the movable picking station, wherein the sequence of picking tasks is determined based on properties of items of an order.

7. An inventory handling system comprising:
multiple shelving units for mounting over a floor, each shelving unit comprise a vertical array of shelves on which containers are placed, wherein at least a portion of containers comprise items wherein the multiple shelving units are arranged over the floor side by side, with a predefined gap between vertical faces of adjacent shelving units, and
a moveable packing station which is configured to travel among the shelving units, wherein the moveable packing station is configured to transfer items between containers, wherein the moveable packing station is configured to collect into an order container at least a portion of a plurality of items listed in an order;
wherein the movable picking station is configured to move along the shelving units within the gap while being engaged on the shelving units on at least one side of the gap, wherein the movable picking station is configured to disengage autonomously from the vertical faces of the shelving units onto one or more floor robots, and wherein the one or more floor robots are configured to transport the movable picking station from one gap to another gap among the shelving units, whereupon the movable picking station is configured to autonomously reengage with the vertical faces of the shelving units in the other gap.

8. The inventory handling system of claim 7, wherein the movable picking station comprises the order container.

9. An inventory handling system comprising:
multiple shelving units for mounting over a floor, each shelving unit comprises a vertical array of shelves on which containers are placed, wherein at least a portion of the containers comprise items;
a moveable packing station, which is configured to travel among the shelving units, wherein the moveable packing station is configured to transfer items between containers, wherein the moveable packing station is configured to collect into an order container at least a portion of a plurality of items listed on the order;
a planning unit wherein the planning unit is configured to determine a sequence of picking tasks for the moveable picking station, wherein the sequence of picking tasks is determined based on properties of items of an order, wherein the planning unit is configured to cause placement within the order container that avoids crushing of previously placed items by newly placed items.

10. A method of inventory handling comprising:
obtaining an order to be fulfilled, wherein the order comprises a list of items to be picked from containers located on shelves in multiple shelving units, wherein the multiple shelving units are mounted over a horizontal floor, wherein each shelving unit comprising a vertical array of the shelves, wherein the items comprise at least one pickable item;
determining a location of a designated container that comprises the at least one pickable item;
operating a movable picking station to pick the at least one pickable item from the determined container and to place the at least one pickable item in an order container, wherein the placement of the at least one pickable item in the order container is performed while the moveable picking station is located at the multiple shelving unit, whereby minimizing the distance the determined container is moved from the location;
operating a floor robot to travel in the horizontal floor among the shelving units along a first path to a rendezvous point; and
conveying the order container from the rendezvous point to a packing station, wherein said conveying is performed using the floor robot.

11. The method of claim 10,
wherein said operating the movable picking station comprises:
causing the movable picking station to travel among the shelving units to reach the location of the designated container; and
picking, by the movable picking station, the at least one pickable item from the designated container, without moving the designated container from the location.

12. The method of claim 10,
wherein the order container is embedded within movable picking station; and
wherein said conveying comprises the floor robot transporting the movable picking station the packing station.

13. The method of claim 10, further comprises:
operating a lift robot to move, independently of the floor robot, and while being suspended above the ground, along a second path in a vertical plane over a vertical face of the one of the shelving units, wherein the vertical face is a plane orthogonal to the horizontal floor;
prior to said operating the movable picking station, transporting the movable picking station, using the lift robot, from a first location to a second location adjacent to the location of the designated container;
after said operating the movable picking station, transporting the movable picking station, using the lift robot, from the second location to the rendezvous point.

14. The method of claim 10, further comprises:
operating a lift robot to move, independently of the floor robot, and while being suspended above the ground, along a second path in a vertical plane over a vertical face of the one of the shelving units, wherein the vertical face is a plane orthogonal to the horizontal floor;
prior to said operating the movable picking station, transporting the designated container, using the lift robot, to a third location adjacent to the movable picking station; and
after said operating the movable picking station, transporting the designated container, using the lift robot, from the third location adjacent to the location of the designated container.

15. The method of claim 14, wherein the movable picking station is located on the floor robot, wherein the third location is at a lowest shelf plane of the shelving unit.

16. The method of claim 15, wherein the movable picking station is located at a lowest shelf plane of the shelving unit, wherein the third location is at the lowest shelf of the shelving unit.

17. The method of claim 10, wherein the items comprise a second pickable item, wherein the second pickable item is heavier than the at least one pickable item, wherein the method further comprises:
   determining a second location of a second container comprising the second pickable item;
   operating the movable picking station to pick the second pickable item from the second container and place the second pickable item in the order container, wherein the at least one pickable item is placed on top of the second pickable item.

18. A method for inventory handling comprising:
   obtaining an order to be fulfilled, wherein the order comprises a list of items to be picked from containers located on shelves in multiple shelving units, wherein the multiple shelving units are mounted over a horizontal floor, wherein each shelving unit comprising a vertical array of the shelves, wherein the items comprise at least one pickable item;
   determining a location of a designated container that comprises the at least one pickable item;
   operating a movable picking station to pick the at least one pickable item from the determined container and to place the at least one pickable item in an order container, wherein the placement of the at least one pickable item in the order container is performed while the moveable picking station is located at the multiple shelving unit, whereby minimizing the distance the determined container is moved from the location;
   operating one or more floor robots to transport the order container to a packaging station, wherein the one or more floor robots travel in the horizontal floor;
   operating to one or more floor robots to transport one or more inventory containers from the shelving units to the packing station, wherein the one or more inventory containers comprise items in a second subset of items from the list of items; and
   at the packing station, assembling in the order container the order by adding to the order container items from the one or more inventory containers.

19. The method of claim 18, further comprises:
   identifying a subset of items from the list of items, wherein the subset of items comprises pickable items, wherein the subset of items comprises the at least one pickable item;
   determining an order of picking the pickable items in the subset of items;
   operating the movable picking station to pick the pickable items from containers and place the pickable items in the order container, wherein picking and placing the pickable items comprise picking and placing the at least one pickable items, wherein said operating is performed in accordance with the order of picking.

* * * * *